(12) United States Patent
Squires

(10) Patent No.: US 9,120,039 B1
(45) Date of Patent: Sep. 1, 2015

(54) METHOD AND APPARATUS FOR LONGITUDINALLY DISPOSED, SHARP PULSE OF LIQUID

(75) Inventor: Arthur M. Squires, Blacksburg, VA (US)

(73) Assignee: Arthur M. Squires Irrevocable Trust, Blacksburg, VA (US)

( * ) Notice: Subject to any disclaimer, the term of this patent is extended or adjusted under 35 U.S.C. 154(b) by 298 days.

(21) Appl. No.: 12/799,856

(22) Filed: May 3, 2010

Related U.S. Application Data

(60) Provisional application No. 61/215,074, filed on May 1, 2009.

(51) Int. Cl.
| | | |
|---|---|---|
| C02F 1/00 | (2006.01) | |
| B01D 15/00 | (2006.01) | |
| B01D 15/02 | (2006.01) | |
| B01D 24/00 | (2006.01) | |
| B01D 24/32 | (2006.01) | |
| B01D 27/02 | (2006.01) | |
| B01D 29/62 | (2006.01) | |
| B01D 33/17 | (2006.01) | |
| B01D 33/46 | (2006.01) | |
| B01D 33/44 | (2006.01) | |
| B01D 35/22 | (2006.01) | |
| B01D 41/00 | (2006.01) | |
| B01D 41/02 | (2006.01) | |
| B01D 33/50 | (2006.01) | |
| B01D 24/46 | (2006.01) | |
| B01J 8/08 | (2006.01) | |
| F16K 31/20 | (2006.01) | |

(Continued)

(52) U.S. Cl.
CPC ............ *B01D 24/4631* (2013.01); *B01D 24/46* (2013.01); *B01D 24/4636* (2013.01); *B01D 24/4642* (2013.01); *B01D 41/00* (2013.01); *B01D 41/02* (2013.01); *C02F 2303/16* (2013.01)

(58) Field of Classification Search
USPC ............. 210/785, 786, 791–794; 137/625.15, 137/625.31
See application file for complete search history.

(56) References Cited

U.S. PATENT DOCUMENTS 3,228,524 A * 1/1966 Richards ........................ 210/138
4,000,066 A * 12/1976 Squires .......................... 210/678

(Continued)

OTHER PUBLICATIONS

Yang, et al. "Granular-bed filtration assisted by filter-cake formation 5. Treating a liquid in a panel bed with pulseback renewal of liquid-entry granular-bed faces", Powder Technology, 2005, 155, 134-138, Elsevier.*

(Continued)

*Primary Examiner* — Nam Nguyen
*Assistant Examiner* — Clare Perrin
(74) *Attorney, Agent, or Firm* — James Creighton Wray

(57) ABSTRACT

There is provided method and apparatus for creating a longitudinally disposed, sharp pulse of liquid, useful for pulseback renewal of liquid-entry faces of a panel-bed liquid filter or a panel-bed liquid-powder contactor. Perforations are disposed along the wall of a tank in a path generally parallel to the tank's axis. Stoppers are provided for stoppering the perforations. With the perforations so stoppered, a liquid is introduced at high pressure into the tank. Thereafter, a quick unstoppering of the perforations releases the liquid from the tank in form of a longitudinally disposed, sharp pulse of liquid moving in a direction perpendicular to the tank's axis. If the tank is placed vertically alongside or within a space that in normal operation receives liquid from a panel bed, the sharp pulse can effectively pulseback the panel bed.

12 Claims, 4 Drawing Sheets

(51) Int. Cl.
*F16K 21/18* (2006.01)
*B01D 3/42* (2006.01)
*E03B 11/00* (2006.01)
*F17D 1/00* (2006.01)
*F16K 11/074* (2006.01)

(56) References Cited

U.S. PATENT DOCUMENTS

| | | | | |
|---|---|---|---|---|
| 5,048,568 | A | * | 9/1991 | Moody .................... 137/625.28 |
| 5,964,248 | A | * | 10/1999 | Enarson et al. .......... 137/625.39 |
| 2007/0108138 | A1 | * | 5/2007 | Martin ......................... 210/793 |

OTHER PUBLICATIONS

Yang, et al. "Granular-bed filtration assisted by filter cake formation 5. Treating a liquid in a panel bed with pulseback renewal of liquid-entry granular-bed faces", Powder Technology, 155, 2005, 134-138, Elsevier.*

J.-S. Yang et al.; *Granular-bed filtration assisted by filter-cake formation*; Powder Technology 155 (2005); pp. 134-136.

J-S. Yang et al.; Granular-bed filtration assisted by filter-cake formation; Powder Technology 155 (2005); pp. 134-138.

* cited by examiner

METHOD AND APPARATUS FOR LONGITUDINALLY DISPOSED, SHARP PULSE OF LIQUID

This application claims the benefit of priority of U.S. Provisional Application having Ser. No. 61/215,074 filed May 1, 2009, which is herein incorporated by reference in its entirety.

FIELD OF THE INVENTION

The invention relates to the renewal of fluid-entry faces in a panel bed of a loose granular solid material employed for intimate contacting of liquid and the solid material for purpose of chemically or physically treating the liquid or the granular solid (or both of these), for example: to filter fine particulate matter ("dirt") from the liquid; to effect a chemical change in liquid or solid; to remove a chemical constituent of the liquid by absorption, adsorption, or chemical reaction. Renewal of liquid-entry faces is accomplished by employment of pulseback: i.e., by subjecting the bed to a sharp pulse of a liquid in a direction reverse to the "forward" flow of the liquid that earlier entered the bed for treatment.

BACKGROUND OF THE INVENTION

U.S. Pat. No. 4,000,066 (Dec. 28, 1976) broadly discusses two significant uses of a panel bed of granular material: (1) for filtering powdery matter from a liquid, the filtration being assisted by an accumulation of powdery matter deposits (filter cakes) upon fluid-entry faces of the granular material; (2) for countercurrent contacting of the granular material with a liquid. See also "Granular-bed filtration assisted by filter-cake formation: 5. Treating a liquid in a panel bed with pulseback renewal of liquid-entry granular-bed faces," by J.-S. Yang, D. R. Whitmire, and A. M. Squires, *Powder Technology*, vol. 155, pp. 134-138, 2005.

The referenced patent discloses means for renewing liquid-entry faces of a panel bed of a granular material in which vertically disposed louvers (resembling slats of a Venetian blind) support the material: i.e., to provide a "reverse" surge flow of liquid toward the liquid-entry faces (a "pulseback"). This surge flow produces a body movement of the granular material toward the faces, spilling moieties of the material from the faces and concomitantly exposing previously underlying material, thereby renewing the faces.

SUMMARY OF THE INVENTION

In experiments at a small scale, pulsebacks have been delivered, originating from the top of the space receiving treated liquid in normal operation, and producing relatively uniform spills of granular material from each of a panel's liquid-entry surfaces. For operation at a significant commercial scale, installation of tall, wide panel beds is required. Without expensive experimentation, involving set-up and study of equipment at a large scale, one cannot be certain that a pulseback originating of the top of the aforementioned space will produce a sufficiently near uniformity of spills, an especially important requirement for a panel bed intended for countercurrent contacting of liquid and a granular material. Accordingly, there is need for improved method and apparatus for supplying pulseback liquid to the tall, wide panel beds that are advantageously specified for the commercial scale.

A primary object of the invention is to provide improved, inexpensive method and apparatus for renewing liquid-entry faces of a large panel bed of granular material.

Another object is to eliminate ducts for carrying pulseback liquid to a space receiving liquid from a panel bed during its normal treatment of "forwardly" flowing liquid.

Another object is to provide pulseback method and apparatus inherently guaranteeing substantially uniform spills of granular material from a multiplicity of liquid-entry surfaces of a tall panel bed.

The present invention relates to a method for producing a longitudinally disposed, sharp pulse of liquid. A tank filled with the liquid is provided with perforations disposed longitudinally along a path generally parallel to the tank's axis. The perforations are stoppered, substantially preventing passage of the liquid there through, and liquid in the tank is elevated in pressure. The perforations are quickly unstoppered, thereby suddenly releasing the liquid in form of a longitudinally disposed, sharp pulse moving in a direction perpendicular to the tank's axis.

The invention also relates to an apparatus for producing a longitudinally disposed, sharp pulse of liquid. The apparatus comprises a tank filled with the liquid and provided with perforations disposed longitudinally along a path generally parallel to the tank's axis; stoppers capable of a first movement into a set of positions whereby the perforations are stoppered, and the stoppers are also capable of a quick, second movement into a second set of positions whereby the perforations are unstoppered; a source of liquid at elevated pressure; a connection between the source and the interior of the tank; and in the connection a valve the opening of which, when the stoppers are in the first set of positions, causes liquid in the tank to assume substantially the elevated pressure, so that the quick, second movement releases liquid from the tank in a longitudinally disposed, sharp pulse of liquid moving in a direction perpendicular to the tank's axis.

Two quick-opening valves of prior art should be mentioned as background for the instant invention. First, the Big Blaster Air Cannon (marketed by Martin Engineering Co., U.S. Route 34, Neponset, Ill. 61345) can provide a sudden release of gas from a chamber at high pressure. A piston separates a small zone and a large chamber, each at the high pressure; fast release of gas from the small zone causes the piston to move smartly into the zone, opening a port for sudden release of gas from the large chamber. Second, U.S. Pat. No. 5,048,568 (17 Sep. 1991) discloses a valve comprising two concentric, perforated, water-filled tubes. While the tubes' perforations are out of registry, an elevated pressure is imposed upon a zone of water that surrounds the tubes. A mechanical arrangement then moves one of the tubes in a motion that brings the tubes' perforations into registry, thereby producing a sharp inward pulse of water capable of launching a projectile from the inner tube. Neither of these prior-art valves is capable of creating the extended, longitudinally disposed, sharp pulse of liquid provided by the instant invention.

Exploiting this extended, longitudinal disposition, the invention also relates to an improved method and apparatus for renewal of a plurality of faces across which liquid enters a panel bed of granular solid material provided for contacting the liquid and the granular material With each other. First, "forward" flow of liquid that undergoes contacting is interrupted. Next, the sharp pulse flow of liquid created by the instant invention is directed, without using a duct to carry the flow, into a space that previously received contacted liquid from the panel. This sharp pulse flow creates a "pulseback" of the granular material, which causes the material to move bodily toward the faces, thereby causing moieties of granular material to fall away from the faces with concomitant exposure of previously underlying granular material, renewing the faces.

In the design of panel beds for use at a commercial scale, an attractive option is an arrangement of two panel beds in a module in which they face "outward": i.e., they receive forwardly flowing liquid to be contacted from a space external to the module; contacted liquid, exiting the two panel beds, enters an interior space bounded by the two beds and two side closures. The interior space could be said to be "vertical": advantageously, its height is considerably greater than the width dimension separating the interiorly-facing sides of the two panel beds.

An attractive arrangement, permitting a designer to specify a panel-bed module much taller than any considered hitherto, is to place the tank of the instant invention vertically alongside the vertical interior space. A preferred pattern for the tank's perforations is a series of holes equally spaced from one another and disposed along a line parallel to the tank's axis, their orientation being such that, when unstoppered, they direct a sharp pulse of liquid moving horizontally into the vertical interior space along this space's entire height. Inherently, with this arrangement, the action of pulseback creates substantially uniform spills from the multiplicity of liquid-entry faces of the module's two panel beds.

A panel-bed module design, however, may employ more than two beds, these cooperatively enclosing an interior space that receives contracted liquid. For example, four panel beds could be arranged to enclose a vertical square space; six beds, a vertical hexagonal space; etc. In such designs, the tank, positioned vertically, could occupy a central location within the interior space; and cylinder perforations could advantageously be disposed in a spiral pattern (or in a pattern of other, more complex form).

Renewing liquid-entry faces of a panel bed and further other objects and features of the invention are apparent in the disclosure, which includes the above and ongoing written specification, with the claims and the drawings.

These and further and other objects and features of the invention are apparent in the disclosure, which includes the above and ongoing written specification, with the claims and the drawings.

BRIEF DESCRIPTION OF THE DRAWINGS

The invention will be more particularly described in conjunction with the following drawings wherein.

DETAILED DESCRIPTION OF THE PREFERRED EMBODIMENTS

Figure 1:
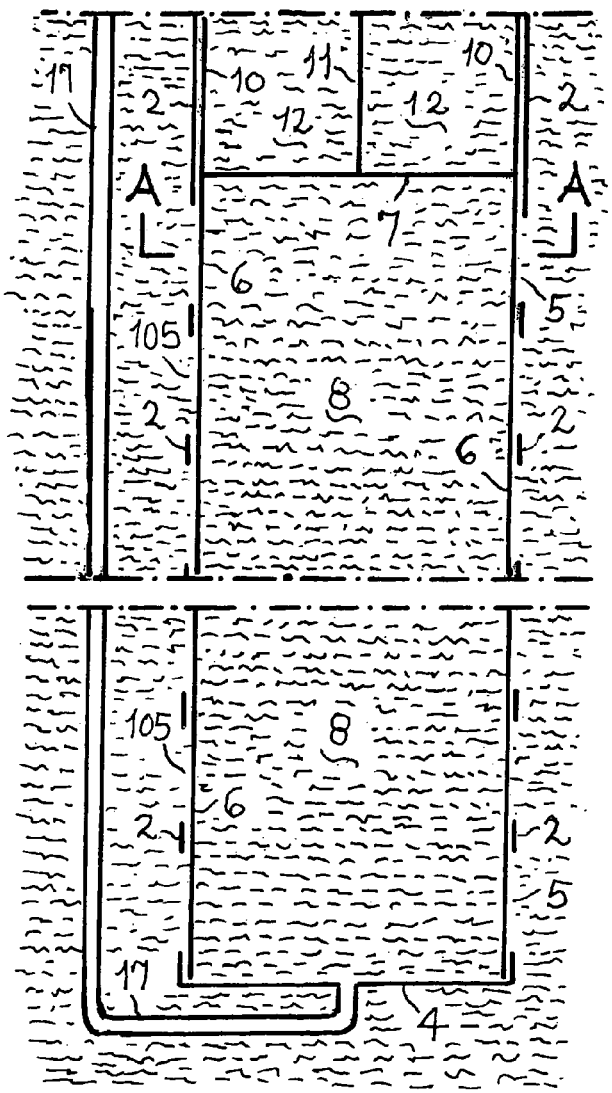
FIG. 1 illustrates a mechanical arrangement suitable for practice of the invention.

In all the figures, like reference numerals refer to like parts having like functions.

Figure 2C:
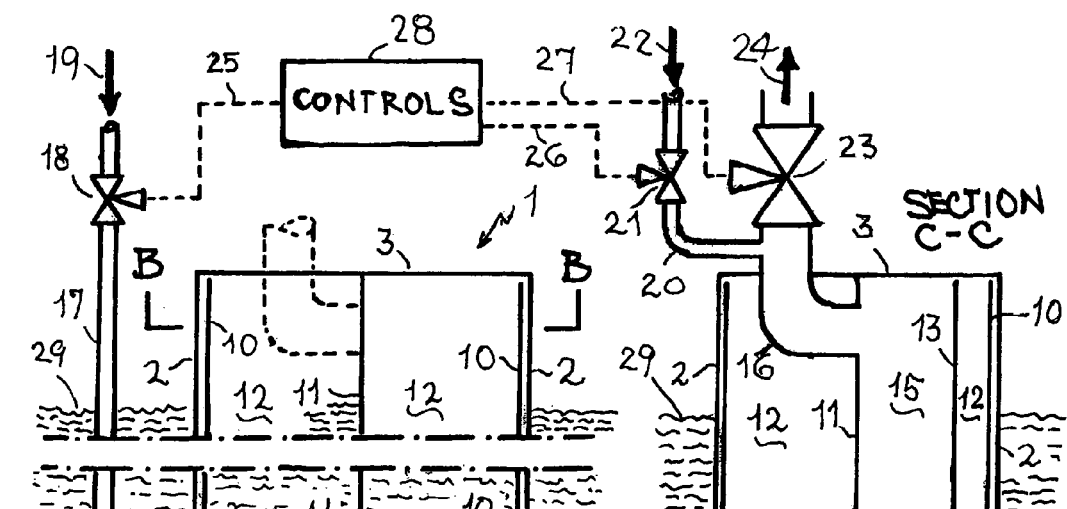
FIG. 2C is a section a C-C of FIG. 2B.
Figure 2A:
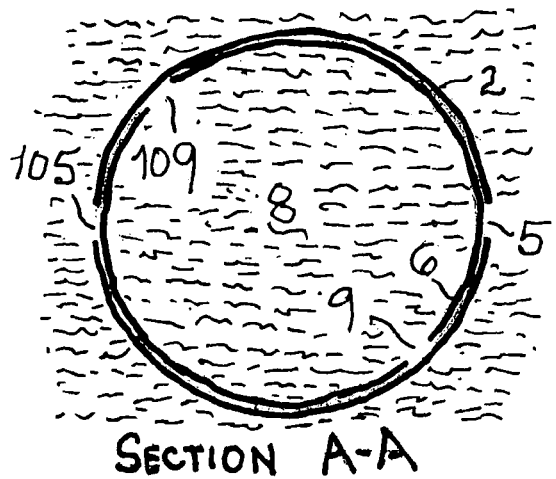
FIG. 2A is a section at A-A of FIG. 1.

FIG. 1 illustrates, in vertical cross-section, an arrangement suitable for stoppering and unstoppering perforations disposed longitudinally along the side of a tank immersed longitudinally within a liquid. Tank 1 comprises relatively long cylinder 2 and end plates 3 and 4. In a lower portion of cylinder 2, entirely surrounded by the liquid, equally spaced perforations 5 are disposed along a straight line substantially parallel to the cylinder's axis. Fitting snugly within this portion of cylinder 2, cylinder 6 is slightly smaller in diameter than cylinder 2. Cooperatively, cylinder 6, lower plate 4, and upper plate 7 enclose space 8. Notice that cylinder 6 is open at the end opposite to plate 7. As will be described shortly, in normal operation of the arrangement of FIG. 1, space 8 is filled with the same liquid as that which surrounds the lower portion of cylinder 2. Perforations 9 in cylinder 6, seen in the cross-sectional drawing FIG. 2A of Section A-A of FIG. 1, have the same dimensions as perforations 5 and are disposed vertically at the same spacing and along a straight line parallel to the line followed by perforations 5. The two sets of perforations, as drawn in FIG. 1, are out of registry, so that portions of cylinder 6 effectively act as stoppers of perforations 5. A rotational motion of cylinder 6 (counterclockwise, as seen in the drawing FIG. 2A of Section A-A) can bring perforations 5 and 9 into registry.

Figure 2B:
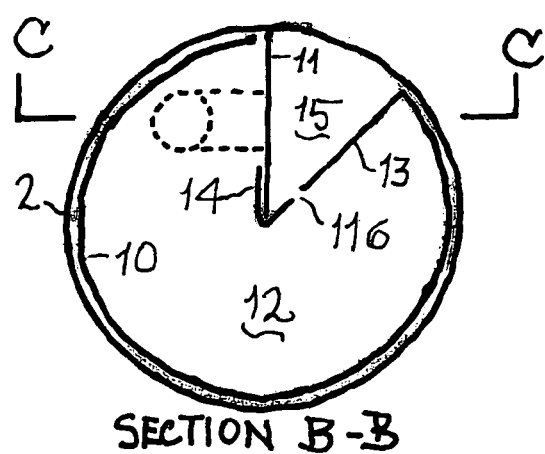
FIG. 2B is a section at B-B of FIG. 1.

An upper portion of cylinder 2 extends beyond liquid surface 29. Partial cylinder 10 is an upward extension of a major part of cylinder 6 (as best seen in the cross-sectional drawing FIG. 2B of Section B-B of FIGS. 1 and 2C of Section C-C). A stationary wall 11 occupies a radius of the upper portion of cylinder 2. Plate 13 articulates with the wall of partial cylinder 10 and occupies a radius of this partial cylinder. At the central point of partial cylinder 10, plate 13 articulates with plate 14, which (as drawn in FIG. 2B Section B-B of FIG. 1) fits closely against plate 11. Cooperatively, partial cylinder 10, plate 13, and major portions of plates 3 and 7 enclose space 12. Cooperatively, plates 11 and 13 and minor portions of plates 3 and 7 enclose space 15, which is much smaller than space 12. Spaces 12 and 15 contain a gas.

Pipe 17 enters space 8 across plate 4 and connects this space via valve 18 with source 19 of liquid at elevated pressure. Pipe 16 enters space 15 across plate 11 and connects this space via valve 23 with the ambient. Pipe 20 connects pipe 16 via valve 21 with source 22 of a gas at elevated pressure. Opening valve 21 quickly elevates gas pressure in space 15; flow of gas through hole 116 in plate 13 elevates the pressure in space 12, more slowly. Opening valve 18 places liquid in space 8 at an elevated pressure. With all three spaces (8, 12, and 15) at elevated pressures, opening valve 23 quickly releases gas from space 15 to the ambient, as indicated by arrow 24. The pressure difference that arises between spaces 12 and 15 drives plate 13 against plate 11, extinguishing space 15 and rotating both partial cylinder 10 and cylinder 6 (counterclockwise as drawn in FIG. 1), thereby bringing perforations 5 and 9 (seen in drawing FIG. 2A of Section A-A of FIG. 1) into registry, and producing a longitudinally disposed, sharp pulse of liquid from space 8 in a direction perpendicular to the axis of tank 1. Connections 25, 26, and 27 permit controls 28 to govern opening or closing of valves 18, 21, and 23 respectively.

Notice that the stoppering of perforations 5, as seen in FIG. 1, need not be absolutely liquid tight. A significant leakage of liquid can be permitted from space 8 after liquid pressure therein has increased, if operation of the arrangement is such that space 8 is held at this pressure for only a relatively short time.

As will be described more fully below, the arrangement of FIG. 1 can be employed to subject a panel bed to pulseback, or, preferably, two "back-to-back" panel beds that constitute a module, the liquid-exit sides of these beds cooperating with end plates to enclose a space for receiving exit liquid. During normal operation of the panel-bed module (treating a liquid, or a granulated solid material, or both of these), valves 18, 21, and 23 are closed. When controls 28 sense that pulseback will soon be required, these direct valve 21 to open. Rising pressure in line 16 drives plate 13 into the position shown in the drawing FIG. 2B of Section B-B, creating space 15. When controls 28 sense that pressures in spaces 12 and 15 are approaching stable values, controls 28 first direct valve 18 to open, elevating the pressure of liquid in space 8; next, close valves 18 and 21; and then open valve 23, creating the sharp pulse of liquid required for an effective pulseback.

In FIG. 1, elements 105 and 109 (FIG. 2A) are optional; they function as already described for elements 5 and 9, respectively. Presence of the optional elements allows the arrangement of FIG. 1 to pulseback two back-to-back panel beds arranged in a panel-bed module (as will be described more fully below).

Figure 3:
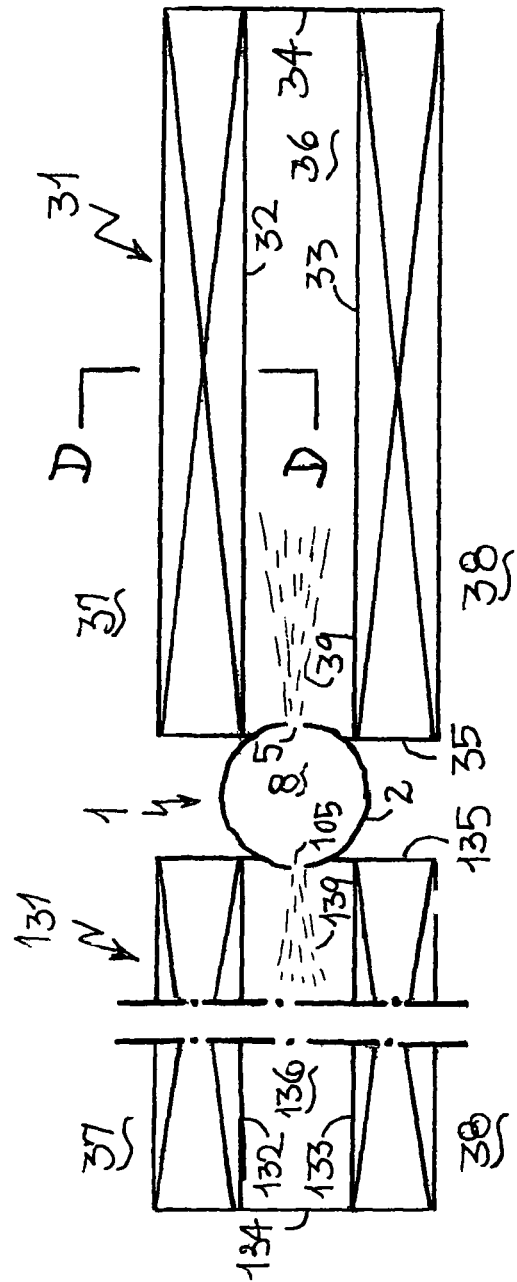
FIG. 3 illustrates use of the arrangement of FIG. 1 to accomplish the pulseback of two panel-bed modules, each comprising two outwardly facing panel beds.

In a schematic, horizontal cross-sectional drawing, the upper drawing in FIG. 3 illustrates use of the arrangement depicted in FIG. 1 (including optional elements 105 and 109) to accomplish the simultaneous pulseback of panel-bed modules 31 and 131. Each module comprises two outwardly facing panel beds (32 and 33 in 31; 132' and 133 in 131). In normal operation of the two panel bed modules, beds 32 and 132 receive liquid for contacting from external space 37; beds 33 and 133 receive liquid from space 38. Beds 32 and 33 discharge liquid into space 36, bounded by liquid-exit sides of beds 32 and 33 and end plates 34 and 35. Beds 132 and 133 discharge liquid into space 136, bounded by liquid-exit sides of beds 132 and 133 and end plates 134 and 135. To accomplish pulseback of the two modules, longitudinally disposed, sharp pulses of liquid 39 and 139 from perforations 5 and 105 enter spaces 36 and 136 respectively.

Figure 4A:
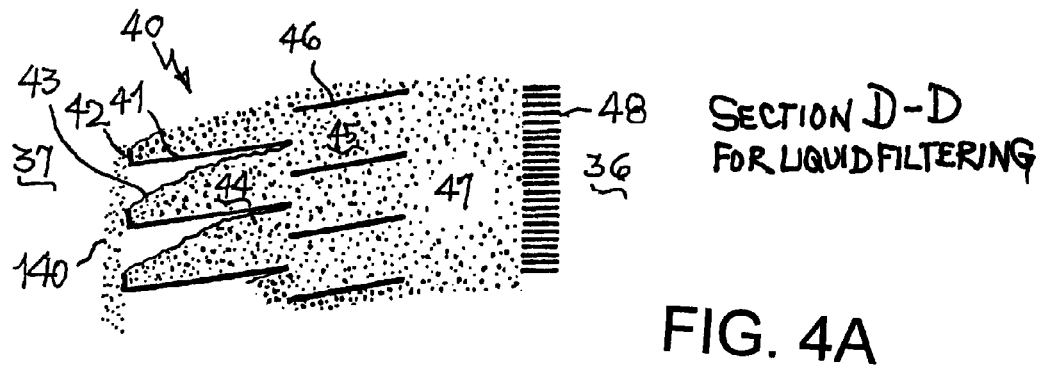
FIGS. 4A and 4B are each a section at D-D of FIG. 3.
Figure 4B:
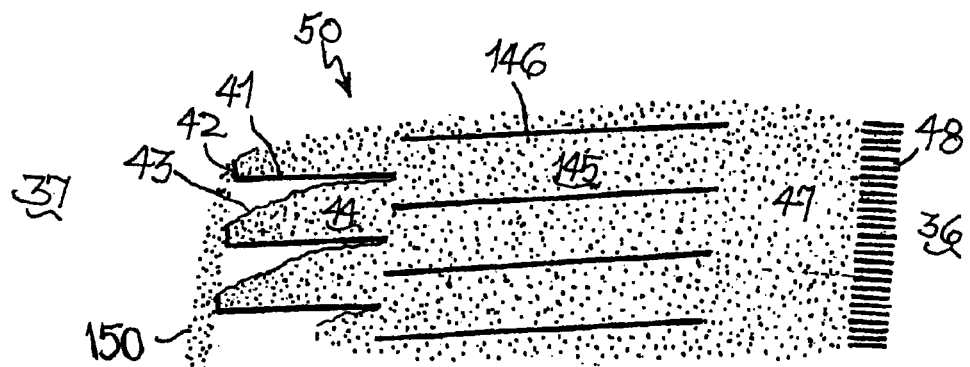

The two drawings FIGS. 4A and 4B of Section D-D in FIG. 3 partially illustrate alternative vertical cross-sectional designs of panel bed 32, each at the moment of pulseback. Each drawing displays how action of pulseback creates a body movement of granular material toward the panel bed's liquid-entry surfaces, causing granular bed spills 140 and 150 to fall away from the outer edges of supporting plates in the upper FIG. 4A and lower FIG. 4B at D-D of FIG. 3, respectively.

The upper D-D drawing FIG. 4A illustrates a preferred panel bed arrangement 40 for filtering powdery matter from a "dirty" liquid, the filtration being assisted by accumulation of filter cakes resting upon granular material liquid-entry faces. Plates 41 and 42 support bed 44 of granular material. In normal operation of panel bed 40, liquid from space 37 enters a bed 44 across a liquid-entry face 43. Liquid entering the bed 44 flows laterally into a bed 45, supported by a plate 46. From the bed 45, liquid flows into vertical supply column 47, situated between the interior edges of plates 46 and retention wall 48, which comprises a panel of narrowly spaced, horizontal louvers. Liquid flowing across wall 48 enters space 36. During pulseback, granular material lost in spill 140 is made good from supply column 47. Plates 46 and beds 45 are supplied to prevent, following a pulseback, the rapid descent of granular material in column 47 from pulling material downward from those spaces 44 that occupy positions toward the top of panel bed 40.

The lower D-D drawing, FIG. 4B illustrates a preferred panel bed arrangement 50 for countercurrent contacting of a liquid and a granular material. Elements 41-44, 47, and 48 serve the same functions as in the upper D-D drawing, FIG. 4A. Liquid flows from bed 44 flows laterally into bed 145 supported by plate 146. Bed 145 serves as a zone for countercurrent contacting of liquid and the granular material. Following a pulseback, fresh material entering 145 (making good the loss in spill 150) together with the forward flow of liquid in normal operation achieve a countercurrent contacting of the liquid and the material.

An example of the application of the arrangement of the lower D-D drawing in FIG. 4B is for service to bring water containing hydrocarbonaceous pollutants into countercurrent contacting with granules of activated carbon, thereby removing the pollutants. Conventional installations for this purpose use deep beds of carbon in an intermittent service in which absorption of pollutants alternates with their desorption, regenerating the carbon for repeated usage. For these absorption and desorption steps, two panel beds can be mounted, one above the other. An advantage of the panel-bed arrangement is its much smaller footprint and inventory of expensive carbon.

While the invention has been described with reference to specific embodiments, modifications and variations of the invention may be constructed without departing from the scope of the invention, which is defined in the following claims.

I claim:

1. A method for renewing liquid entry faces of a bed comprising granular material, comprising:
    producing countercurrent pulses of liquid into a bed of granular material, into a vertical supply column of the granular material in the bed, causing the granular material to move bodily toward liquid entry faces of the granular material in the bed;
    spilling granular material from liquid entry faces of the bed, and making good loss of the granular material in the spilling from the vertical supply column;
    producing a longitudinally disposed, sharp pulse of liquid into a treated liquid space adjacent the bed by:
    providing a vertical tank in the treated liquid space, said vertical tank, the tank having an outer cylinder with a cylindrical wall and upper and lower ends,
    disposing perforations longitudinally along the cylindrical wall, wherein the perforations are spaced from each other in a path parallel to an axis of said vertical tank;
    stoppering said perforations; and sequentially:
    introducing liquid at elevated pressure in said tank;
    quickly unstoppering said perforations, thereby releasing said liquid from said vertical tank in form of longitudinally disposed, sharp pulses of liquid into the treated liquid space in a direction perpendicular to said axis of said vertical tank, wherein the perforations are in a small portion of a circumference of said vertical tank, and thereby pulsing liquid through the vertical supply column and spilling granular material from the liquid entry faces.

2. The method of claim 1, wherein said path is a straight line.

3. The method of claim 1, wherein
    said vertical tank comprises a first cylinder with a first set of perforations disposed along a first path;
    the first cylinder having an upper plate and a lower plate and having a connection in the lower plate for introducing liquid at elevated pressure in said vertical tank;
    said stoppering comprises placing a second cylinder fitting snugly within said first cylinder, an axis of said second cylinder being identical with an axis of said first cylinder;
    the second cylinder having a cylindrical wall, upper plate and an open lower end;
    in the cylindrical wall of said second cylinder, disposing a second set of perforations longitudinally along a second path, identical to said first path, yet also disposing said second set of perforations such as not to be in registry with said first set of perforations;

wherein the first and second sets of perforations have the same dimensions;

after introducing liquid at elevated pressure in said first cylinder, quickly moving said second cylinder and allowing the two sets of perforations to come into registry, thereby unstoppering said first set of perforations.

4. The method of claim 1, wherein said longitudinally disposed, sharp pulse effects
the pulseback of a panel bed of granular solid material employed for liquid filtering or liquid-powder contacting.

5. The method of claim 1, further comprising a panel bed holding granular material disposed vertically parallel to said vertical tank with the perforations in said vertical tank facing the panel bed, wherein the perforations in said vertical tank are aligned with the panel bed.

6. The method of claim 5, wherein the panel bed has a liquid entry surface and an opposite liquid exit surface and the perforations are directed toward the liquid exit surface to cause granular material spills from the liquid entry surface of the panel bed.

7. A method for renewing liquid entry faces of a panel bed comprising liquid contacting granular material, comprising:
providing producing a countercurrent contacting a liquid and a liquid contacting granular material;
flowing the countercurrent into a panel bed of the liquid contacting granular material
through a vertical supply column of the liquid contacting granular material in the panel bed and out through liquid entry faces of the liquid contacting granular material in the panel bed;
spilling the liquid contacting granular material from liquid entry faces of the panel bed, and making good loss of the liquid contacting granular material in the spilling from the vertical supply column;
pulseback of a panel bed of granular solid material employed for liquid filtering or liquid-powder contacting through action of a longitudinally disposed, sharp pulse of liquid, by:
placing a vertical tank within or alongside a space receiving treated liquid from a liquid-exit side of said panel bed, a height of said vertical tank being substantially identical to a height of said space;
in said vertical tank, disposing perforations longitudinally along a path parallel to an axis of said tank;
stoppering said perforations; and sequentially:
introducing liquid at elevated pressure in said vertical tank;
quickly unstoppering said perforations, thereby releasing said liquid in form of a longitudinally disposed, sharp pulse of liquid moving into said space, thereby effecting the pulseback of the treated liquid through said panel bed.

8. The method of claim 7, wherein
said vertical tank comprises a first cylinder with a first set of perforations disposed along a first path;
the first cylinder having an upper plate and a lower plate and having a connection in the lower plate for introducing liquid at elevated pressure in said vertical tank;
said stoppering comprises placing a second cylinder fitting snugly within said first cylinder, an axis of said second cylinder being identical with an axis of said first cylinder;
the second cylinder having a cylindrical wall, upper plate and an open lower end;
in the cylindrical wall of said second cylinder, disposing a second set of perforations longitudinally along a second path, identical to said first path, yet also disposing said second set of perforations such as not to be in registry with said first set of perforations;
after introducing liquid at elevated pressure in said vertical tank, quickly moving said second cylinder and allowing the two sets of perforations to come into registry, thereby unstoppering said first set of perforations and flowing the longitudinally disposed, sharp pulse of liquid into the space receiving treated liquid.

9. Apparatus for renewing liquid entry faces of a panel bed comprising liquid contacting granular material, comprising:
a panel bed of liquid contacting granular material having liquid entry faces; a space receiving treated liquid inside the panel bed; a vertical tank within the space receiving treated liquid inside the panel bed for producing a longitudinally disposed, sharp pulse of liquid in the space receiving treated liquid inside the panel bed;
a vertical tank having a cylindrical wall;
the cylindrical wall having perforations disposed longitudinally along a path parallel to an axis of said vertical tank;
wherein the perforations comprise a small fraction of the cylindrical wall of said vertical tank;
stoppers movable by a first movement into a first set of positions whereby said perforations are stoppered and also movable by a quick second movement into a second set of positions whereby said perforations are unstoppered;
a source of liquid at elevated pressure, a connection between said source and an interior of said vertical tank, and a valve in said connection, wherein opening the valve when said stoppers are in said first set of positions, causes said vertical tank to be filled with said liquid at elevated pressure, so that said quick second movement releases said liquid from said vertical tank in form of a longitudinally disposed, sharp pulse of liquid in a direction perpendicular to said axis of said vertical tank into the space receiving treated liquid for pulsing liquid in a counter current through the space receiving treated liquid inside the panel bed and into the panel bed of liquid contacting granular material and spilling portions of the liquid contacting granular material from the liquid entry faces.

10. The apparatus of claim 9, wherein
said vertical tank comprises a first cylinder and said perforations are a first set of perforations disposed in a cylindrical wall of the first cylinder along a first path parallel to an axis of the first cylinder;
the first cylinder having an upper plate and a lower plate and having a connection in the lower plate for introducing liquid at elevated pressure in said vertical tank;
further comprising a second cylinder fitting snugly and rotatable into first and second positions within said first cylinder, an axis of said second cylinder being identical with an axis of said first cylinder;
the second cylinder having a cylindrical wall, an upper plate and an open lower end;
in the cylindrical wall of said second cylinder, a second set of perforations longitudinally disposed along a second path, identical to said first path, said second set of perforations disposed to not be in registry with said first set of perforations in the first position;
wherein the first and second sets of perforations have the same dimensions;
after introducing liquid at elevated pressure in said first cylinder, said second cylinder being quickly rotatably movable, allowing the two sets of perforations to come into registry in the second position, thereby unstoppering said first set of perforations and quickly releasing said liquid at elevated pressure through the two sets of perforations in registry and through the first cylinder into the space receiving treated liquid.

11. The apparatus of claim 10, wherein the panel bed holding the liquid contacting granular material is disposed vertically and parallel to said vertical tank with the first set of perforations in said vertical tank facing the panel bed, wherein the first set of perforations in said vertical tank are aligned with the panel bed, and wherein the second cylinder is quickly rotated into the second position and liquid at elevated pressure is pulsed through the space receiving treated liquid and the panel bed in counter current.

12. The apparatus of claim 11, wherein the panel bed has a liquid exit surface opposite the liquid entry faces and the first set of perforations are directed toward the liquid exit surface to cause liquid contacting granular material spills from the liquid entry face of the panel bed.

* * * * *